(12) United States Patent
Kollep et al.

(10) Patent No.: US 12,042,086 B2
(45) Date of Patent: Jul. 23, 2024

(54) USER INTERFACE OF BEVERAGE PREPARATION MACHINE

(71) Applicant: SOCIÉTÉ DES PRODUITS NESTLÉ S.A., Vevey (CH)

(72) Inventors: Alexandre Kollep, Lutry (CH); Matteo Bolognesi, Dompierre (CH); Minh Quan Phan, Bussigny (CH)

(73) Assignee: Societe des Produits Nestle S.A., Vevey (CH)

( * ) Notice: Subject to any disclaimer, the term of this patent is extended or adjusted under 35 U.S.C. 154(b) by 4 days.

(21) Appl. No.: 15/769,643

(22) PCT Filed: Oct. 18, 2016

(86) PCT No.: PCT/EP2016/074915
§ 371 (c)(1),
(2) Date: Apr. 19, 2018

(87) PCT Pub. No.: WO2017/067896
PCT Pub. Date: Apr. 27, 2017

(65) Prior Publication Data
US 2018/0303283 A1     Oct. 25, 2018

(30) Foreign Application Priority Data

Oct. 23, 2015   (EP) .................................. 15191220

(51) Int. Cl.
*A47J 31/52*    (2006.01)
*G05B 19/042*   (2006.01)

(52) U.S. Cl.
CPC ............ *A47J 31/52* (2013.01); *A47J 31/525* (2018.08); *A47J 31/5255* (2018.08); *G05B 19/042* (2013.01); *G05B 2219/2645* (2013.01)

(58) Field of Classification Search
CPC .... A47J 31/3633; A47J 31/44; A47J 31/4407; A47J 31/52; A47J 31/525; A47J 31/5255;
(Continued)

(56) References Cited

U.S. PATENT DOCUMENTS

| 4,400,194 A | 8/1983 | Starr |
| 2004/0134924 A1* | 7/2004 | Hansen .................. A47K 10/36 221/9 |

(Continued)

FOREIGN PATENT DOCUMENTS

| CN | 101262802 A | 9/2008 |
| CN | 102089733 A | 6/2011 |

(Continued)

OTHER PUBLICATIONS

WO 2013/160318 A1 (Year: 2013).*

(Continued)

*Primary Examiner* — Helena Kosanovic
*Assistant Examiner* — Tiffany T Tran
(74) *Attorney, Agent, or Firm* — K&L Gates LLP

(57) ABSTRACT

A beverage or foodstuff preparation machine (4) comprising: a component processing unit (14) to process a beverage or foodstuff component to prepare a beverage or foodstuff therefrom; and a control system (16) operable to execute a preparation process comprising controlling said component processing unit to prepare the beverage or foodstuff, the control system comprising a user interface (36), wherein the user interface comprises: a contactless sensor (40) operable to sense without physical contact a body part of a user; and a feedback unit operable to provide feedback to a sensor, said body part of a user; and in response to change a value of a parameter associated with the preparation process and to indicate via the feedback unit the change in value.

9 Claims, 6 Drawing Sheets

(58) Field of Classification Search
CPC .... A47J 31/4492; A47J 31/56; A47J 31/3671;
A47J 31/469; A47J 31/30; A47J 31/41;
A47J 31/467; A47J 31/002; A47J 31/545;
G05B 19/042; G05B 2219/2645; G05B
2219/264; G06F 3/017
USPC ..... 99/279, 283, 285, 289 R, 275, 280, 281,
99/288, 290, 295
See application file for complete search history.

(56) References Cited

U.S. PATENT DOCUMENTS

| | | | | |
|---|---|---|---|---|
| 2006/0286262 | A1* | 12/2006 | Stearns | A47J 31/41 |
| | | | | 426/596 |
| 2010/0116842 | A1* | 5/2010 | Hecht | B67D 1/0888 |
| | | | | 222/1 |
| 2013/0247771 | A1* | 9/2013 | Maisch | A47J 31/3633 |
| | | | | 99/283 |
| 2014/0158035 | A1* | 6/2014 | Schwarzberger | D05B 65/06 |
| | | | | 112/475.01 |
| 2014/0188271 | A1* | 7/2014 | Hernandez | G06F 3/04817 |
| | | | | 700/232 |
| 2014/0237432 | A1* | 8/2014 | Geurts | G06F 3/005 |
| | | | | 715/863 |
| 2015/0135962 | A1 | 5/2015 | Jarisch et al. | |
| 2015/0157169 | A1* | 6/2015 | Kruger | A23F 5/262 |
| | | | | 426/232 |
| 2015/0173561 | A1* | 6/2015 | Foster | B65D 85/8043 |
| | | | | 215/11.1 |
| 2016/0037597 | A1* | 2/2016 | Randolph | H05B 45/56 |
| | | | | 315/158 |
| 2017/0196397 | A1* | 7/2017 | Flick | A47J 31/3623 |

FOREIGN PATENT DOCUMENTS

| | | |
|---|---|---|
| CN | 103327858 A | 9/2013 |
| CN | 103327859 | 9/2013 |
| CN | 103797440 | 5/2014 |
| EP | 1749464 | 2/2007 |
| WO | 2012072767 | 6/2012 |
| WO | 2015016709 | 2/2015 |

OTHER PUBLICATIONS

WO2013160278A1 (Year: 2012).*
Chinese Office Action for Chinese Patent Appl No. 2016800609074 dated Nov. 25, 2019.

* cited by examiner

USER INTERFACE OF BEVERAGE PREPARATION MACHINE

CROSS REFERENCE TO RELATED APPLICATIONS

The present application is a National Stage of International Application No. PCT/EP2016/074915, filed on Oct. 18, 2016, which claims priority to European Patent Application No. 15191220.1, filed on Oct. 23, 2015, the entire contents of which are being incorporated herein by reference.

TECHNICAL FIELD

The present invention relates to a beverage or foodstuff preparation machine and in particular to a user interface for control of said machine.

BACKGROUND

Increasingly machines for the preparation of a beverage or foodstuff are configured to operate using a container that comprises a single-serving of a beverage or foodstuff material, e.g. coffee, tea, ice cream, yoghurt. The machine may be configured for preparation by processing said material in the container, e.g. with the addition of fluid, such as milk or water, and the application of mixing thereto, such a machine is disclosed in PCT/EP13/072692. Alternatively, the machine may be configured for preparation by at least partially extracting an ingredient of the material from the container, e.g. by dissolution or brewing, and expelling it into a receptacle for end user consumption. Examples of the latter such machines are provided in EP 2393404 A1, EP 2470053 A1, WO 2009/113035.

The increased popularity of these machines may be partly attributed to enhanced user convenience compared to a conventional machine, e.g. compared to a manually operated stove-top espresso maker or cafetiére (French press).

In particular the aforesaid machines comprise a component processing unit, which is operable to process the said material via the application of a fluid (typically water) to the desired beverage or foodstuff. A control system controls the component processing unit to execute a preparation process. A preparation process has associated therewith many parameters that may be adjusted for user preference, e.g. temperature, volume, strength, start/stop. Accordingly the control system comprises a user interface for user adjustment of the many parameters.

Examples of user interfaces for adjustment of parameters associated with a preparation process are provided in EP 2571409, CH 693016, U.S. Pat. Nos. 6,732,634 and 2,155,023. Hence known user interfaces of such machines comprise mechanically actuated units and/or devices that require a touch input, e.g. one or a combination of: buttons; dials; switches; and graphical screens with touch sensing. A drawback with such user interfaces is that they can be unsightly. A further drawback is that they can be expensive to produce. A yet further drawback is that they can occupy/require a large amount of space on the machine. A yet further drawback is that with repetitive use, particularly in a commercial environment, they can become unhygienic and difficult to clean. A yet further drawback is that they can be uninteresting for a user to operate.

Thus in spite of the considerable effort already invested in the development of said user interfaces, further improvements are desirable.

SUMMARY OF THE INVENTION

An object of the invention is to provide a beverage or foodstuff preparation machine with a user interface that that can adjust parameters associated with a beverage preparation process which is hygienic to use.

It would be advantageous to provide such a user interface that is cosmetically appealing.

It would be advantageous to provide such a user interface that is compact.

It would be advantageous to provide such a user interface that is cost effective.

It would be advantageous to provide such a user interface that is easy to clean.

It would be advantageous to provide such a user interface that is stimulating for the end user and convenient to operate.

Objects of the invention are achieved by: the beverage or foodstuff preparation machine disclosed herein; and the method disclosed herein.

Disclosed herein according to a first aspect of the invention is a beverage or foodstuff preparation machine comprising: a component processing unit to process a beverage or foodstuff component to prepare a beverage or foodstuff therefrom; and a control system operable to execute a preparation process (e.g. by execution of a beverage or foodstuff preparation program stored on a memory associated with a processor) comprising controlling said component processing unit to prepare the beverage or foodstuff, the control system comprising a user interface (to receive user instructions for said control, e.g. user instructions to execute a preparation process and to control an aspect of said process), wherein the user interface comprises: a contactless sensor operable to sense without physical contact (i.e. between the body part and sensor) a body part of a user; and a feedback unit operable to provide feedback to a user, wherein the control system is configured to: sense as input, using the contactless sensor, said body part of a user (i.e. an interaction by the user using said body part with the user interface); and in response to change a value of a parameter associated with (e.g. use in) the preparation process and to indicate via the feedback unit the change in value. The feedback unit and contactless sensor are generally arranged discrete from each other. Typically the value is changed from a stored value to a different stored value. The body part is typically a hand of a user.

Advantageously objects of the invention are achieved since a user does not have to touch the user interface of the machine to change the parameter. In particular, the user interface is stimulating for the end user and convenient to operate.

The parameter (e.g. one or more values thereof) is preferably stored on a memory unit of the control system. The parameter preferably comprises a variable that can be changed in value to achieve a different characteristic of the prepared food stuff or beverage, e.g. the parameter is preferably used in the preparation process to control the component preparation unit, such as the fluid heater and/or pump. The parameter may for example be a recipe for quantity of an added component (e.g. water or milk) or a processing instruction (e.g. a time duration for a particular phase of the preparation process, at temperature or a volume). The parameter may be one or a combination of: beverage or foodstuff volume (e.g. cup fil size); beverage or foodstuff temperature; beverage or foodstuff strength; pressure during the preparation process; flow rate during the preparation process; pre-wetting time (e.g. for ground coffee); brewing time.

In particular the contactless sensor may be configured to sense a one of a: proximity; movement; gesture of the body part of the user. Accordingly the contactless sensor may comprise one of a: proximity sensor; a movement sensor; a gesture sensor.

It is preferable that the contactless sensor comprises a proximity sensor. The proximity sensor may be configured for proximity detection by one or a combination selected from a group consisting of:

electromagnetic field; electromagnetic radiation (infra-red); capacitance; induction; photoelectric. It is preferable that the proximity sensor is an optical, infra-red sensor.

The feedback unit may comprise an audio indicator, such as an alarm or pre-recorded verbal instruction. Alternatively the feedback unit may comprise a visual indicator, such as a light source that may comprise an LED (light emitting diode) or bulb or lamp. The feedback unit may comprise a plurality (e.g. 2, 3, 4, 5 or more) visual indicators, which may be arranged discrete from each other. Each visual indicator may be to indicate a separate value or a change in value of the parameter (e.g. each visual indicator is associated with a particular value). Each indicator may comprise a light source with separate or integrated indicia. Preferably there are two or three or four indicators, each indicating a different volume of the prepared beverage of foodstuff (e.g. small, medium or large).

The control system may be configured, for a subsequent preparation process executed without input sensed by the contactless sensor (i.e. an interaction of a body part of a user sensed during a preparation process), to use a previous value or a default value for the parameter and to indicate via the feedback unit said previous value of the parameter.

The control system may be configured, for each input sensed by the contactless sensor (i.e. each interaction from a body part of a user, which is intended to interact with the user interface), to increment the parameter to the next of a plurality of stored values (e.g. the parameters can be cycled through in a loop by a plurality of sensed inputs, whereby each change in value is indicated by the feedback unit). Such a configuration is particular advantageous (for sensors in proximity or motion detection configuration) since a single contactless sensor can be utilised, thereby reducing cost. In a less cost effective example two such sensors are used: one to increment the parameter up and one to increment down.

The control system may be configured to sense subsequent (i.e. each) inputs from a body part (i.e. to determine subsequent interactions made by a user via a body part) by: the removal and introduction of the body part in the operative range of the sensor (e.g. introduction and removal comprises a single interaction); a duration the body part is maintained in the operative range of the contactless sensor, i.e. by time intervals (the longer the body part is maintained in the operative range of the sensor the more interactions are determined, e.g. one interaction is determined for each second; or by another suitable manner (such as changing the distance between the body part and the sensor). In such examples the contactless sensor is generally a proximity sensor. Such configuration of the control system is advantageous since more than one sensor is obviated. The invention is thus more cost effective.

The control system may be configured to execute a preparation process: upon receiving an instruction from a user via the user interface (typically a different component of the user interface to those aforedescribed, such as a power-up/switch on button/switch); and/or upon detecting the presence of a container (e.g. a container detected by the later described detection unit).

The control system may be configured to enable incrementing of said parameter if an input is sensed by the contactless sensor within a first predetermined amount of time (such as 2.5, 5, 7.5, 10, 15, or any value between 2.5 and 15 seconds) from execution of a preparation process (i.e. the incrementing is not enabled if no input is sensed within the first predetermined amount of time).

The control system may be configured to stop the preparation process if: an input is sensed by the contactless sensor after the first predetermined amount of time; and optionally if said input is sensed less than second predetermined amount of time from execution of a preparation process, whereby the second predetermined amount of time is greater than the first predetermined amount of time (e.g. it is greater than by 2.5, 5, 7.5, 10, 15, or any value between 2.5 and 15 seconds. In this way the first and second predetermined amount of time bound a time envelope for stoppage of a preparation process. The control system may be configured to restart the preparation process if an input (i.e. a further input) is sensed by the contactless sensor within a third predetermined amount of time from stoppage of the preparation process (e.g. 2.5, 5, 7.5, 10, 15, or any value between 2.5 and 15 seconds).

The component processing unit may comprise one of an: an extraction unit; a dissolution unit; a mixing unit. The component processing unit may further comprise a fluid supply that is operable to supply fluid to the aforesaid unit. Generally the fluid supply comprises a fluid pump and a fluid heater. The aforesaid units may be configured for operation with a container containing beverage or foodstuff material.

The beverage or foodstuff preparation machine may further comprise: a container transmission unit arranged to receive a container from a user (e.g. is comprises a movable container support which is exposed with respect to a housing of the machine) and operable to effect transfer of a received container to component processing unit. The control system may further comprise a container detection unit to detect a container received by the container transmission unit. The detection unit may comprise an inductive sensor to sense a metallic portion (e.g. a body or lid portion of a capsule) of a metallic container. Alternatively the detection unit may comprise an optical sensor or other suitable sensor. The control system may be configured, upon detection of a container received by container transmission unit, to control the container transmission unit to effect said transfer. It may in addition be configured to execute a preparation process and/or to switch the contactless sensor and feedback unit of the user interface to an operational state. Advantageously, a user can execute a preparation process without having to touch the beverage or foodstuff preparation machine. The container transmission unit may optionally comprise a covering member configured to cover the detection unit to prevent accidental triggering of said transfer and a preparation process.

The control system may be configured to control the container transmission unit to effect transfer of a received container to the component processing unit if an input is sensed by the contactless sensor. Generally the aforesaid control is enabled only pre execution of a preparation process. Advantageously a user can manually control the transmission unit to transfer an undetected capsule, e.g. a plastic capsule, whereby the detection unit is configured to detect a metallic capsule. The control system may be configured to effect said control if an input is determined from a body part within the latter defined first distance range and/or second distance range.

The contactless sensor comprises (i.e. exclusively or in addition to one of the other sensor types) a proximity sensor operable to identify a distance of a body part of a user. The control unit may be configured to determine if said body part is within a first distance range or a second (i.e. non overlapping) distance range, which is different to the first distance range. The first distance range may be associated with the aforesaid input sensing, i.e. those to change the value of the parameter. The first distance range may be a distance distal said sensor, e.g. greater than directly at or 5 cm or 10 cm from the contactless sensor and optionally up to the nominal range of the sensor. The second distance range may be a distance proximal said sensor, e.g. a directly at (e.g. a user placed their hand directly over the sensor) or less than 5 cm or 10 cm from the sensor.

The control system may be configured to operate in a user programmable mode if a an input sensed by the contactless sensor is determined within the second and distance range, said user programmable mode comprising user defining a value for the parameter. Preferably the user defined value is associated with one of the visual indicators (e.g. the visual indicator which is indicating the change or default or previous value of the parameter). Preferably the aforesaid operation in the programmable mode is enabled post execution of a preparation process. Preferably a volume of the beverage or foodstuff that has been dispensed is set to the user defined value when the contactless sensor ceases to sense a body part of a user (e.g. a user removes their hand). Alternatively a temperature of the beverage may be set to a user defined value based on a duration of the contactless sensor sensed the body part of the user, e.g. a longer sensing period equates to a higher temperature or the converse.

The container is for use (e.g. it is suitably dimensioned) by a beverage or foodstuff preparation machine. The container is for containing beverage or foodstuff material (e.g. it has an internal volume and may be food safe). The container may be a single-serving container, i.e. it is dimensioned for containing a dosage of beverage or foodstuff material for preparation of a single serving (e.g. pre portioned) of said product. The container may be a single-use container, i.e. it is intended to be used in a single preparation process after which it is preferably rendered unusable, e.g. by perforation, penetration, removal of a lid or exhaustion of said material. The container may comprise one of the following: capsule; packet; receptacle for end user consumption of the beverage or foodstuff therefrom. The capsule may have an internal volume of 5-80 ml. The receptacle may have an internal volume of 150-350 ml. The packet may have an internal volume of 150-350 ml or 200-300 ml or 50-150 depending on the application. Preferably the container is a capsule containing beverage preparation material.

Disclosed herein according to a second aspect of the invention is provided a method of preparing a beverage or foodstuff preferably using the beverage or foodstuff preparation machine as defined according to any feature of the first aspect. The method comprising: executing on said machine a preparation process comprising a control system thereof controlling a component processing unit to prepare said beverage or foodstuff; sensing by a contactless sensor of the control system a body part of a user; changing, in response to said sensing, a value of a parameter associated with the preparation process; and indicating, via the feedback unit, the change in value. The method may further comprise operating the beverage or foodstuff preparation machine in accordance with any feature of the first aspect.

Disclosed herein according to a third aspect of the invention is provided a use of a container as described in the first aspect for a beverage or foodstuff preparation machine according to any feature of the first aspect.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF EXEMPLARY EMBODIMENTS

Beverage/Foodstuff Preparation System

Figure 1:
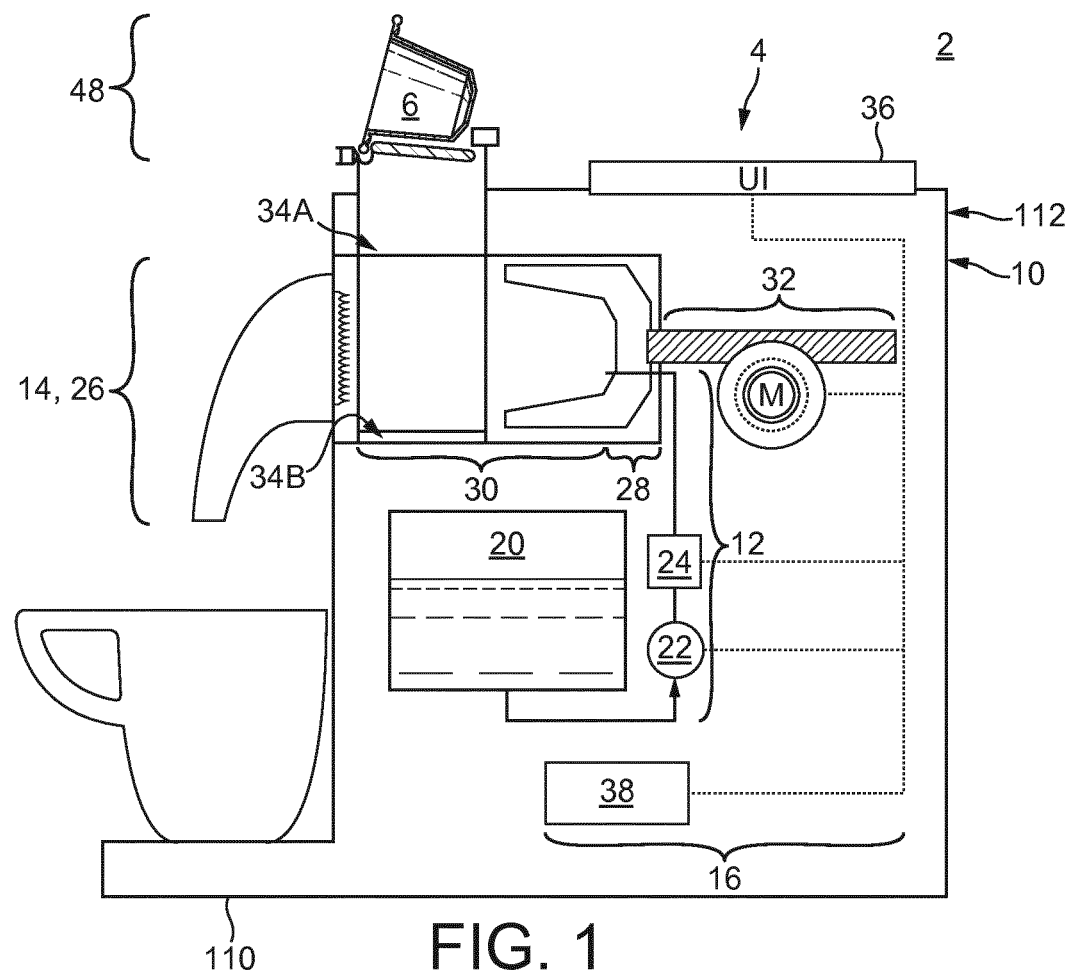
FIG. 1 is an illustrative view showing an embodiment of a beverage or foodstuff preparation system that comprises a beverage or foodstuff preparation machine and a container according to the invention.

A beverage or foodstuff preparation system 2, an example of which is illustrated in FIG. 1, comprises at a first level thereof: a beverage or foodstuff preparation machine 4; a container 6, which are described following.

Preparation Machine

The beverage or foodstuff preparation machine 4 is operable to process a beverage or foodstuff component, which may comprise a container containing a portion of beverage or foodstuff material (hereon material), or the material in situ, to a foodstuff and/or beverage for consumption by eating and/or drinking. Generally processing comprises the addition of fluid, such as water or milk to said material. A foodstuff material as defined herein may comprise a substance capable of being processed to a nutriment generally for eating, which may be chilled or hot, non-exhaustive examples of which are: yoghurt; mousse; parfait; soup; ice cream; sorbet; custard; smoothies. Generally the foodstuff prepared is a liquid or a gel. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. a said machine 4 can prepare both a foodstuff and a beverage.

The preparation machine 4 is generally dimensioned for use on a work top, i.e. it is less than 70 cm in length, width and height. The preparation machine 4 comprises at a first level thereof: a housing 10; a component processing unit 14; and a control system 16, which are described sequentially as follows.

Housing

The housing 10 houses and supports said machine first level components and comprises at a second level of the preparation machine 4: a base 110 for abutment of a horizontally arranged support surface; a body 112 for mounting thereto the other first level components.

Component Processing Unit

Depending on the particular embodiment the component processing unit 14 may be configured to prepare a foodstuff/beverage by processing material arranged in: a single-serving, single use container 6 that is a packet or capsule; a container 6 that is a receptacle for end-user consumption therefrom; situ; and a combination thereof. In particular the material is processed to effect a change it its composition, e.g. by dissolution or extraction or mixing of an ingredient thereof. Embodiments of each configuration of will be discussed.

In general in all the embodiments the component processing unit 14 comprises at a second level of the preparation machine 4 a fluid supply 12 that is operable to supply fluid to the container 6. The fluid is in general water or milk, the fluid maybe conditioned (i.e. heated or cooled). The fluid supply 12 typically comprises at a third level of the preparation machine 4: a reservoir 20 for containing fluid, which in most applications is 1-5 litres of fluid; a fluid pump 22, such as a reciprocating or rotary pump that may be driven by an electrical motor or an induction coil; an optional fluid heater 24, which generally comprises an in-line, thermo block type heater; an outlet for supplying the fluid. The reservoir 20, fluid pump 22, fluid heater 24, and outlet are in fluid communication with each other in any suitable order and form a fluid line. The fluid supply 12 may optionally comprise a sensor to measure fluid flow rate and/or the amount of fluid delivered. An example of such a sensor is a flow meter, which may comprises a hall or other suitable sensor to measure rotation of a rotor, a signal from the sensor being provided to the processor 38 as will be discussed.

Component Processing Unit for Extraction of Foodstuff/Beverage from Container

According to an embodiment the component processing unit 14 is operable: to receive the container 6 containing material; process the container 6 to extract one or more ingredients of a beverage therefrom, and to dispense the said ingredients into an alternate receptacle for end-user consumption. The container is generally a single-use, single-serving container such as a capsule or packet.

A component processing unit 14 for use with the said capsule will initially be described, an example of which is shown in FIG. 1. The component processing unit 14 comprises an extraction unit 26 operable to move between a capsule receiving position and a capsule extraction position, when moving from the capsule extraction position to the capsule receiving position, the extraction unit may be moved through or to a capsule ejection position, wherein a spent capsule can be ejected therefrom. The extraction unit 26 receives fluid from the fluid supply 12. The extraction unit 26 typically comprises: an injection head 28; a capsule holder 30; a capsule holder loading system 32; a capsule insertion channel 34A; a capsule ejection channel 34B, which are described sequentially.

The injection head 28 is configured to inject fluid into a cavity of the capsule 6 when held by the capsule holder 30, and to this end has mounted thereto an injector, which has a nozzle that is in fluid communication with the outlet of the fluid supply 12.

The capsule holder 30 is configured to hold the capsule 6 during extraction and to this end it is operatively linked to the injection head 28. The capsule holder 30 is operable to move to implement the said capsule receiving position and capsule extraction position: with the capsule holder in the capsule receiving position a capsule 6 can be supplied to the capsule holder 30 from the capsule insertion channel 34A; with the capsule holder 30 in the capsule extraction position a supplied capsule 6 is held by the holder 30, the injection head 28 can inject fluid into the cavity of the held capsule, and one or more ingredients can be extracted therefrom. When moving the capsule holder 30 from the capsule extraction position to the capsule receiving position, the capsule holder 30 can be moved through or to the said capsule ejection position, wherein a spent capsule 6 can be ejected from the capsule holder 30 via the capsule ejection channel 34B.

The capsule holder loading system 32 is operable to drive the capsule holder 30 between the capsule receiving position and the capsule extraction position.

The aforedescribed container extraction unit 14 is generally a pressurised extraction unit, e.g. the container is hydraulically sealed and subject to 5-20 bar during brewing. Generally the pump is an induction pump. The extraction unit may alternatively operate by centrifugation as disclosed in EP 2594171 A1, which is incorporated herein by reference.

The component processing unit 14 may alternatively comprise a dissolution unit configured as disclosed in EP 1472156 and in EP 1784344, which are incorporated herein by reference.

In the example of the container 6 comprising a packet the container processing unit 14 comprises an extraction and/or dissolution unit operable to receive the packet and to inject, at an inlet thereof, fluid from the fluid supply 12. The injected fluid mixes with material within the packet to at least partially prepare the beverage, which exits the packet via an outlet thereof. The extraction or dissolution unit comprises: a support mechanism to receive an unused packet and eject a spent packet; an injector configured to supply fluid to the packet from the outlet of the fluid supply. Further detail is provided in WO 2014/125123, which is incorporated herein by reference.

Component Processing Unit for Preparation of Foodstuff/Beverage in Container for End User Consumption According to a further embodiment the component processing unit 14 (not shown), is generally operable to prepare material stored in a container 6 that is a receptacle, such as a cup, pot or other suitable receptacle configured to hold approximately 150-350 ml of prepared product. Herein the component processing unit 14 comprises a mixing unit which comprises: agitator unit; an optional auxiliary product unit; thermal exchanger; receptacle support, which will be described sequentially.

The agitator unit is operable to agitate material within the receptacle for at least partial preparation thereof. The agitator unit may comprise any suitable mixing arrangement, e.g. a: planetary mixer; spiral mixer; vertical cut mixer. Typically the agitator unit comprises: an implement for mixing having a mixing head for contact with the material; and a drive unit, such as an electric motor or solenoid, to drive the mixing implement. In a preferred example of a planetary mixer the mixing head comprises an agitator that rotates with a radial angular velocity W1 on an offset shaft that rotates with gyration angular velocity W2, such an arrangement is disclosed in PCT/EP13/072692, which is incorporated herein by reference.

The auxiliary product unit is operable to supply an auxiliary product, such as a topping, to the container 6. The auxiliary product unit comprises: a reservoir to store said product; an electrically operated dispensing system to effect the dispensing of said product from the reservoir.

The thermal exchanger is operable to transfer and/or extract thermal energy from the receptacle. In an example of transfer of thermal energy it may comprise a heater such as thermo block. In an example of extraction of thermal energy it may comprise heat pump such as a refrigeration-type cycle heat pump.

The receptacle support is operable to support the container during a preparation process such that the container remains stationary during agitation of the material therein by the agitator unit. The receptacle support preferably is thermally associated with the thermal exchanger such that transfer of thermal energy can occur with a supported receptacle.

In a variant of the above, the component processing unit 14 further comprises a dispensing mechanism for receiving a container 6 (such as a packet) and dispensing the associated material into the receptacle, where it is prepared. Such an example is disclosed in EP 14167344 A, which is incorporated herein by reference.

In a further variant of the above, the mixing unit comprises a dispensing mechanism operable to dispense from a reservoir a single serving of the associated material into the receptacle, where it is prepared and/or to prepare the material in situ before dispensing into the receptacle. Such an example is disclosed in WO 2010/034722 and in WO 2013/014142, which are incorporated herein by reference.

Container Transmission unit

Figure 2:
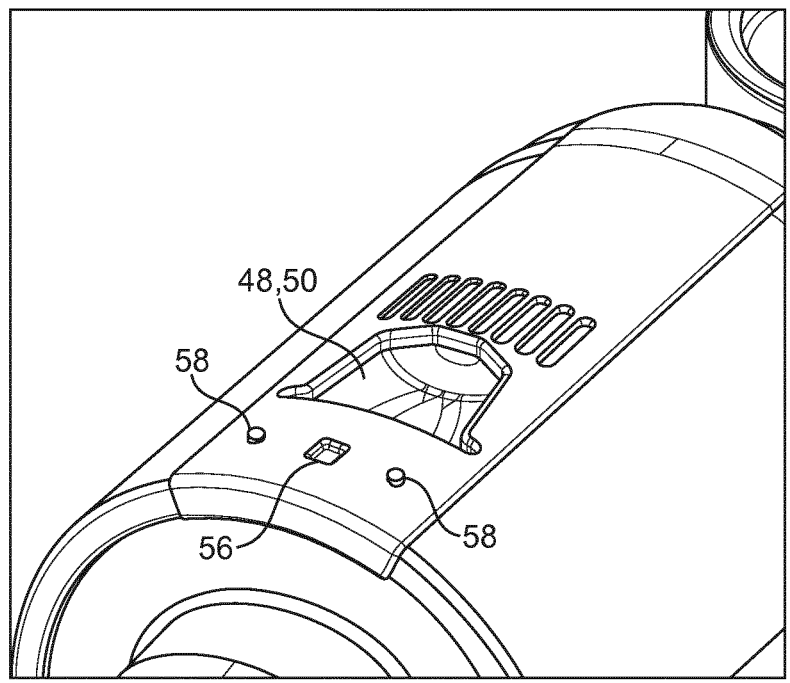
FIGS. 2 and 3 are respective perspective and cut-sectional views showing a container transmission unit, feedback unit and contactless sensor according to embodiments of the beverage or foodstuff preparation machine.
Figure 3:
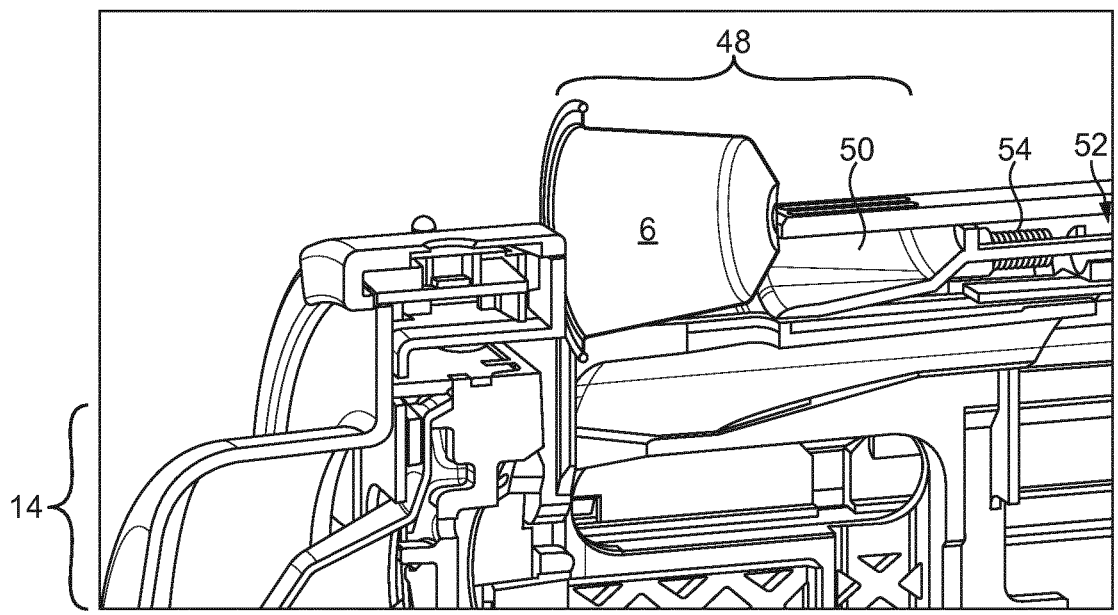

In embodiments wherein the component processing unit 14 processes a container 6 the beverage or foodstuff preparation machine 4 may comprise a container transmission unit 48, which is operable to receive a container 6 from a user and transfer said container 6 to the component processing unit 14. An example of a container transmission unit 48 is shown in FIGS. 2 and 3, which show said unit 48 adapted for a container 6 that is a capsule. The container transmission unit 48 typically comprises: a movable container support 50; an actuation unit 52 to actuate said support 50.

The movable container support 50 is operable to move between a container receiving position and a container transmission position, whereby when moved from the former to the latter of said positions a received container 6 is transferred to the component processing unit 14. In particular said support 50 may be configured to transition between said positions in a sliding and/or rotating or other manner. In the example shown in FIG. 4 the support 50 is slideable and is shown in the container transmission position. Generally the movable container support 50 is arranged above the component processing unit 14, such that a container is transmitted by gravity from said support 50 to said unit 14.

The actuation unit 52 is operable to drive the support 50 between said positions, and may comprise various actuators and/or mechanisms coupled thereto depending on the configuration of the support, e.g.: a linear or rotary actuator that is driven by an electrical motor (not shown). The actuation unit 52 is controlled by the control system 16 as will be discussed.

Control System General

Figure 4:
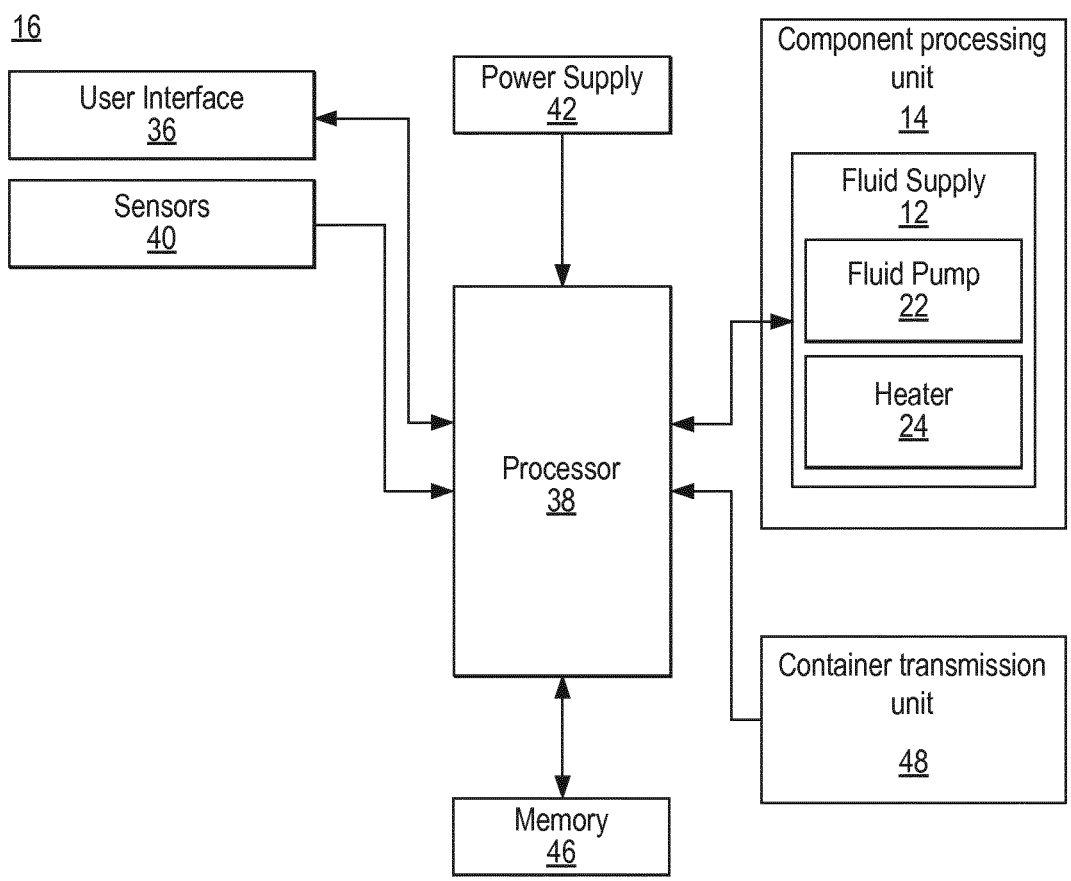
FIG. 4 is a block diagram showing a control system of the beverage or foodstuff preparation machine according to FIG. 1.

The control system 16, an example of which is illustrated in FIG. 4, is operable to control the component processing unit 14 to execute a preparation process, which comprises the preparation of the beverage/foodstuff. The control system 16 typically comprises: a user interface 36; a processor 38; optional sensors 40; a power supply 42, which are described sequentially.

The user interface 32 comprises hardware to enable an end user to interface with the processor 38 and hence is operatively connected thereto. More particularly: the user interface receives commands from a user; a user interface signal transfers the said commands to the processor 38 as an input. The commands may, for example, be an instruction to execute a preparation process. The hardware of the user interface is described in more detail following. The user interface may comprise various hardware, e.g.: buttons, such as a joystick button or press button; joystick; LEDs; graphic or character LDCs; graphical screen with touch sensing and/or screen edge buttons.

Optional sensors 40 are operatively connected to the processor 38 to provide an input for monitoring said process. The sensors 40 typically comprise one or more of the following: fluid temperature sensors; fluid level sensors; position sensors e.g. for sensing a position of the extraction unit 26; flow rate and/or volume sensors.

The processor 38 is generally operable to: receive an input, i.e. said commands from the user interface 36 and/or from the sensors 40; process the input according to program code stored on a memory unit (or programmed logic); provide an output, which is generally the said preparation process. The process may be executed with open-loop control, or more preferably with closed-loop control using the input signal from the sensors 40 as feedback. The processor 38 generally comprises memory, input and output system components, which are arranged as an integrated circuit, typically as a microprocessor or a microcontroller. The processor 38 may comprise other suitable integrated circuits, such as: an ASIC; a programmable logic device such as an FPGA; an analogue integrated circuit such as a controller. The processor 38 may also comprise one or more of the aforementioned integrated circuits, i.e. multiple processors. The processor 38 generally comprises a memory unit 46 for storage of the program code (such as a preparation program executable for a preparation process) and optionally data. The memory unit 46 typically comprises: a non-volatile memory e.g. EPROM, EEPROM or Flash for program code and operating parameter storage; volatile memory (RAM) for data storage. The memory unit may comprise separate and/or integrated (e.g. on a die of the processor) memory. Typically the processor 38 comprises a clock for timing of the preparation process (and for execution of instructions) as will be discussed.

The power supply 42 is operable to supply electrical energy to the processor 38 and component processing unit 14, and in particular the pump 22 as will be discussed. The power supply 42 may comprise various means, such as a battery or a unit to receive and condition a mains electrical supply.

Control System According to Invention

The control system 16 according to the invention comprises the user interface 36 to receive user instructions for control of a preparation process, wherein the user interface 36 comprises: a contactless sensor 56 operable to sense without physical contact between said sensor and a user a body part of a user; and a feedback unit 58 operable to provide feedback to a user, an example arrangement of the user interface is shown in FIG. 2. The contactless sensor 56 and feedback unit 58 are typically connected to the processor as shown generally with respect to the user interface 36 in FIG. 4.

In particular the control system 16 is: configured to sense as an input by the contactless sensor 56 a body part of a user (i.e. an interaction between the user via a body part and machine); and in response to change a value (e.g. a value which is stored in the memory unit 46 of the processor 38) of a parameter associated with the preparation process and to indicate via the feedback unit the change in value.

The control system 16 sensing said input may comprise: the contactless sensor 56 itself (e.g. via a separate processing unit on the sensor) sensing the input processing said input and providing a notification signal to the processor 38; the contactless sensor 56 providing a signal to the processor 38, which is subsequently processed by the processor to determine said sensing.

The parameter may comprise any variable associated with the preparation process (which may vary depending on the embodiment of the component processing unit 14). In particular parameter is a variable that can be changed in value to achieve a different characteristic of the prepared food stuff or beverage, for example it may be a recipe related parameter for quantity of an added component (e.g. water or milk etc.) or a processing instruction (e.g. temperature, flow rate etc.). Accordingly the parameter is generally selected from a list comprising the following: temperature of the prepared beverage or foodstuff; volume of the prepared beverage or foodstuff; strength of the prepared beverage or foodstuff; another parameter associated with the composition of the prepared beverage or foodstuff, e.g. level of crema or frothing; pressure during the preparation process; flow rate during the preparation process (both of which can result in a different composition of product e.g. amount of crema/strength thereof).

The contactless sensor 56 may be configured to sense an interaction of the user by one of a: proximity; movement; gesture of the body part of the user. Accordingly the contactless sensor may comprise one of a: proximity sensor; a movement sensor; a gesture sensor; other suitable sensor. The body part of a user which is sensed is typically a hand of a user. In the example of a proximity sensor, for triggering, the body part may be arranged within the operative range of the sensor, the sensor may also be able to determine the range of the body part from itself. In the example of a movement sensor, for triggering, the body part may be moved within the operative range of the sensor, e.g. above a threshold speed. In the example of a gesture sensor, for triggering, a user may make one or more gestures (e.g. with their fingers) which are identified by the sensor.

Typically the operative, i.e. nominal, range of the contactless sensor 56 is 0.5-1 meter away from the sensor (otherwise, in the instance of a proximity sensor for example, the sensor could be triggered by items placed above the machine).

The following examples are provided generally with reference to the preferred proximity sensor, however it will be appreciated that they may extend to the other aforesaid sensor types (or these types in combination with the proximity sensor). The proximity sensor may be configured for proximity detection by one or a combination selected from a group consisting of: electromagnetic field; electromagnetic radiation (infrared); capacitance; induction; photoelectric. It is preferable that the proximity sensor is an optical and infra-red sensor, a suitable example is ST Microelectronics VL6180.

The feedback unit 58 comprise hardware to indicate the change in value of the parameter, and may comprise a visual and/or audio indicator. In the preferred example of visual indicators the feedback unit 58 generally comprises a plurality (e.g. 2, 3, 4, 5, 6 or more) discrete visual indicators 60, whereby each visual indicator 60 indicates a separate value of the parameter. The visual indicators 60 generally comprise a light source 64 such as an LED (light emitting diode) or other suitable light source such as a lamp/bulb.

The visual indicators 60 may further comprise indicia 62 to indicate the change in value of the parameter. The indicia 62 may be: arranged on or arranged in operative proximity to the light source 64; or displayed by the light source (e.g. the light source is configured or is programmable to display a particular object). The indicia 62 generally comprise an image e.g.: a receptacle fill volume if the aforesaid parameter is a volume of the prepared beverage or foodstuff; a colour to indicated hot or colour (e.g. respective red or blue) temperature if the aforesaid parameter is temperature of a prepared beverage or foodstuff.

Figure 5A:
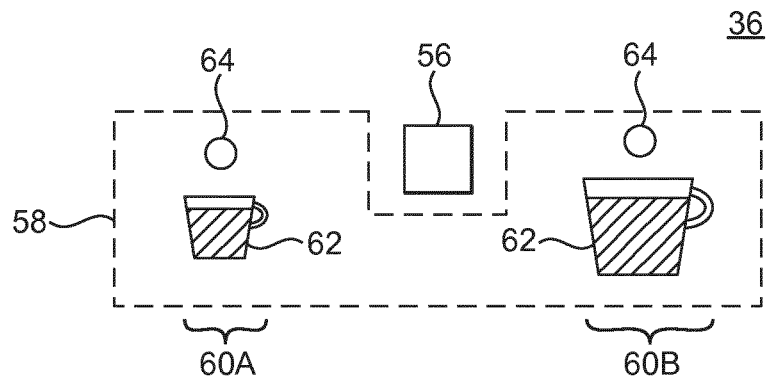
FIG. 5 comprises illustrative diagrams showing embodiments of the aforesaid feedback unit.
Figure 5B:
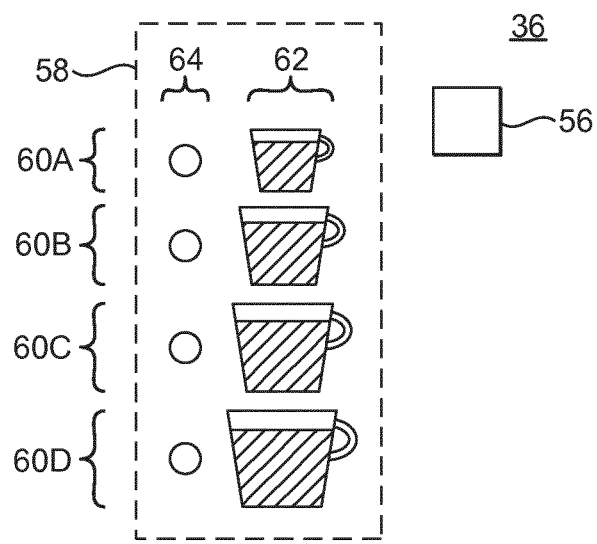

FIG. 5A shows an example wherein the feedback unit 58 comprises two visual indicators 60A, 60B, each comprising a light source 64 and a indicia 62, in particular: the parameter is a volume of the prepared beverage or foodstuff; the light source 64 comprise an LED; the indicia 62 are printed on the housing 10 of the machine 4 in operative proximity thereto; the indicia 62 comprise an image of a partially filled receptacle, whereby the first visual indicator 60A has the indicia 62 indicating a smaller receptacle size than that indicia of the second visual indicator 60B. FIG. 5B shows the example of FIG. 5A extended to comprise four visual indicators 60A-60D.

The aforesaid indicating the change in value of the parameter may comprise: indicating a difference in the value of the parameter; and/or indicating the value it is changed to. In the case of the latter optionally the previous value of the parameter may also be indicated. In such an example the control system 16 is generally configured to access the value of the parameter (e.g. from the memory unit 46) and to make the appropriate change thereto, e.g. to another value.

The aforesaid indicating a difference in the value of the parameter may comprise indicating the difference in the actual value or indicating a representative difference. As examples of the former: a unit change of the volume of a beverage or foodstuff is displayed in $cm^3$ (e.g. $\pm 10$ $cm^3$); a unit change of the temperature of a beverage or foodstuff is displayed ° C. (e.g. $\pm 2°$ C.). As examples of the latter: a change of the volume of a beverage or foodstuff is displayed as a slide bar that moves along an axis representing volume change; a change of the temperature of a beverage or foodstuff is displayed as slide bar that moves along an axis representing hot and cold temperature change.

The aforesaid indicating the value the parameter is changed to may comprise indicating the actual value or a representative amount of the parameter assumes. As examples of the former: the actual volume of a beverage or foodstuff is displayed in $cm^3$; the actual temperature of a beverage or foodstuff is displayed in ° C. As examples of the latter: a receptacle with a fill level associated with the actual fill level is displayed or a slide bar that moves along an axis representing volume; a the temperature of a beverage or foodstuff is displayed as slide bar that moves along an axis representing hot and cold temperature.

In a preferred example (as show in FIG. 5) the parameter is volume and it is preferred to indicate a value the parameter is changed to. The following examples use such a configuration, although they may be adapted for other parameters and indications thereof.

Optional Logic Conditions of Control System

The control system 16 may be configured to implement various logic conditions associated with the contactless sensor 56 sensing interactions of a body part of the user and subsequent control of a preparation process and the feedback unit 58. These logic conditions are optionally combined for descriptive purposes in FIG. 6 for a general preparation process 66. Typically block 68 is initially executed which comprises indicating to a user via the feedback unit 58 a current value of the parameter.

Figure 6:
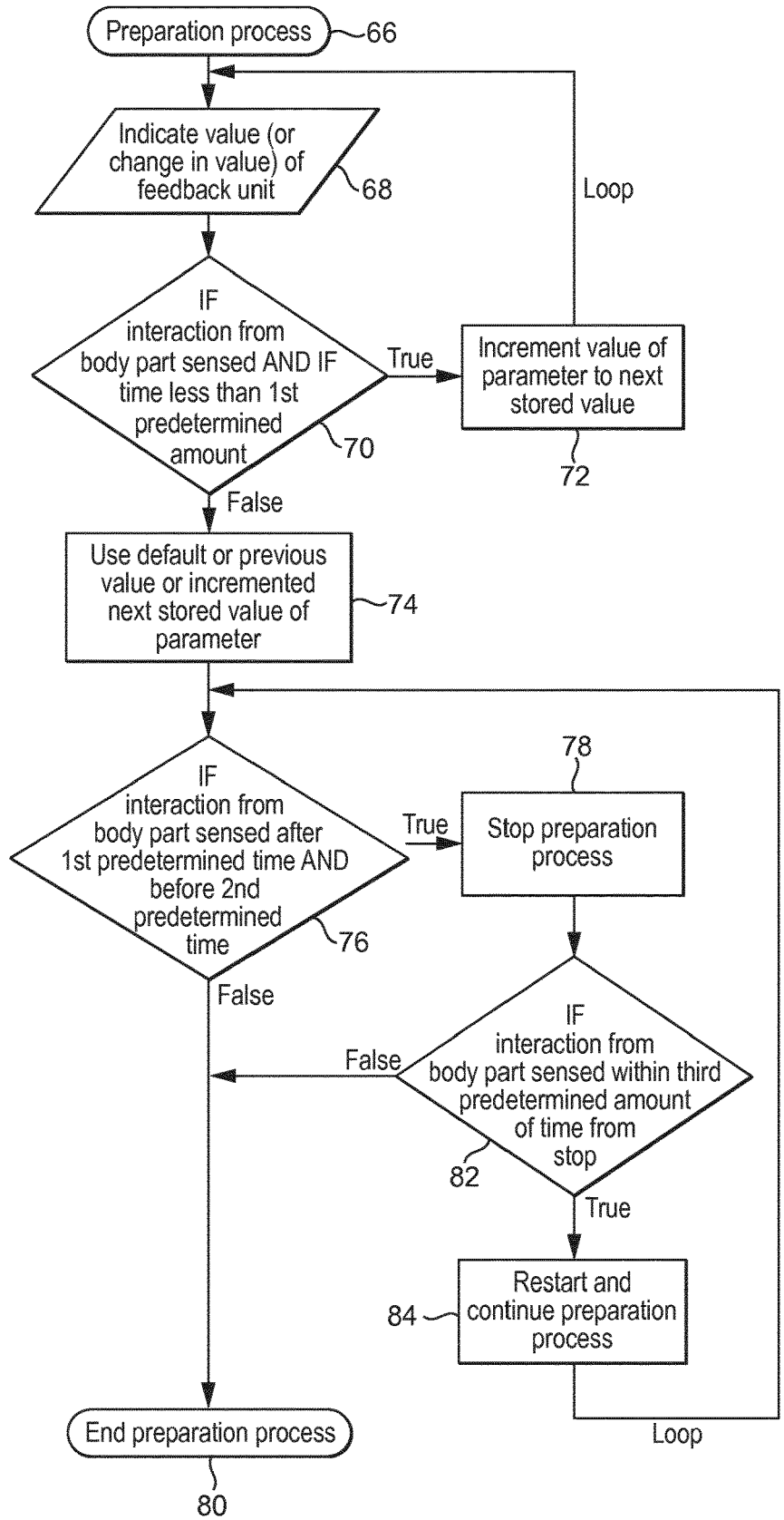
FIGS. 6-8 comprise flow diagrams showing various conditions that may be executed by the control system of the beverage or foodstuff preparation machine.

Referring to FIG. 6, as illustrated by optional condition 70, during the preparation process the control system 16 may be configured to determine whether a body part of a user is sensed (e.g. if a hand of a user is placed within operative range of the contactless sensor 56 when in proximity confirmation), and if the body part is sensed (i.e. an interaction is made by the user) then to execute block 72, which comprises incrementing the parameter to the next in a sequence of a plurality of stored values.

Taking the example of FIG. 5A: a first sensing of a body part (i.e. a first interaction made by a user) causes the visual indicator 60A only to emit light and a first value for the parameter selected; a second sensing (i.e. a further interaction made by a user) of a body part causes the visual indicator 60B only to emit light and a second value for the parameter selected; and a third sensing of a body part causes the visual indicator 60A only to emit light and the first value for the parameter selected; the cycle being repeated with further sensing.

Taking the example of FIG. 5B: a first sensing of a body part (i.e. a first interaction made by a user) causes the visual indicator 60A only to emit light and a first value for the parameter selected; a second sensing (i.e. a further interaction made by a user) of a body part causes the visual indicator 60B only to emit light and a second value for the parameter selected; a third sensing of a body part causes the visual indicator 60C only to emit light and a third value for the parameter selected; a fourth sensing of a body part causes the visual indicator 60D only to emit light and a forth value for the parameter selected; the cycle being repeated with further sensing.

First and subsequent sensing of a body part of a user (i.e. a first and subsequent interactions made by a user) may be determined by the control system 16 in various ways depending on the particular configuration of the contactless sensor 56.

In the instance of the contactless sensor 56 being a proximity sensor, the control system may be able to distinguish between subsequent interactions by a user based on: the removal and introduction of the body part in the operative range of the sensor (e.g. introduction and removal comprises a single interaction); time intervals (the longer the body part is maintained in the operative range of the sensor the more interactions are determined, e.g. one interaction is determined for each second; or by another suitable manner (such as changing the distance between the body part and the sensor). It is preferred to use the removal and reintroduction approach. Distinguishing between interactions may also be achieved using more than one such sensor (e.g. one sensor sense an interaction in its operative range to cycle up and the other to cycle down) although a single sensor solution is preferable due to cost.

In the instance of the contactless sensor 56 being a movement sensor the control system may be able to distinguish between subsequent interactions by a user based on the aforesaid removal and introduction of the body part in the operative range of the sensor.

In the instance of the contactless sensor 56 being a gesture sensor the control system may be able to distinguish between subsequent interactions by a user based on the switching between identifiable gestures.

In FIG. 6 the cycling of the value of the parameter is indicated by the looping of condition 70 and block 72. The loop typically comprises re-executing block 68 such that the change in value of the parameter is indicated to the user.

As an optional aspect of logic condition 70, the control system 16 may be configured to enable the aforesaid incrementing of the value of the said parameter if an interaction from a body part is sensed within a first predetermined amount of time of execution of a preparation process (e.g. 2.5 or 5 or 10 or 15 seconds, which is typically measured using the clock of the processor 38). Otherwise the parameter may not be adjustable. In this way the control system only accept commands to adjust the said parameter when it is possible for it to be adjusted, e.g.: after the first predetermined amount of time the beverage or foodstuff may have been prepared to a volume greater than indicated by one or more of the visual indicators 60 of the feedback unit 58; after the first predetermined amount of time the beverage or foodstuff may have been prepared to a temperature greater or less than indicated by one or more of the visual indicators 60 of the feedback unit 58.

At block 74, the control system 16 may be configured such that a value for the parameter used in the subsequent preparation process is: a default value; or the value used in the previous preparation process; or if an interaction from a body part has been sensed according to condition 70 and the value of the parameter changed according to block 72, then the incremented next stored value of the parameter. In such a mode of operation generally the control system 16 is configured to indicate via the feedback unit the value of the parameter to be used.

At optional condition 76, the control system 16 may be configured determine if an interaction body part has been made after the aforesaid first predetermined amount of time and if true then to execute block 78 to stop the preparation process. In this way the interaction of the user by their body part functions to switch off a preparation process rather than adjust a parameter. Advantageously the range of functions of the user interface 36 is increased. Alternatively an interaction from a body part sensed after the first predetermined amount of time may have no effect.

At optional condition 76, in addition to the immediately preceding condition, the control system 16 may be configured to effect the said stopping (i.e. block 78) of the preparation process only if said interaction from a body part is sensed less than a second predetermined amount of time from start of the preparation process, whereby the second predetermined amount of time is greater than the first predetermined amount of time, e.g. it may be 10 or 15 or 20 seconds. In this way it is not possible to stop a preparation process which is complete/nearly complete.

The control system 16 may be configured to continue and complete the preparation process if no interactions from body parts are sensed after the first predetermined amount of time and optionally if no interactions from body parts are sensed before the second predetermined amount of time, as indicated by the false connection of condition 76 to block 80.

In the configuration wherein if an interaction of a body part is sensed after the first predetermined amount of time and optionally before the second predetermined amount of time and the preparation process is stopped (i.e. condition 76 is true and block 78 is executed), optionally the control system 16 may be configured to restart the preparation process if a further interaction of a body part is sensed within a third predetermined amount of time from the stopping of the preparation process, e.g. 2.5 or 5 or 10 seconds. In FIG. 6 the latter is indicated by condition 82 and restart by block 84. In this way a user can restart the preparation process if they decide they have stopped it too early. With such a condition the preparation process generally continues from the point of termination using the same value of the parameter.

Optionally, subsequent to the immediately preceding condition, a further interactions of a body part sensed may effect stopping of the preparation process in accordance with the aforesaid stopping condition, (as indicated by the loop from block 84 to condition 76 in FIG. 6). In such an instance the time duration of the preparation process may be considered stopped for the purpose of the logic conditions (e.g. the determination of lapse of the second predetermined amount of time) until the preparation process restarted.

Figure 7:
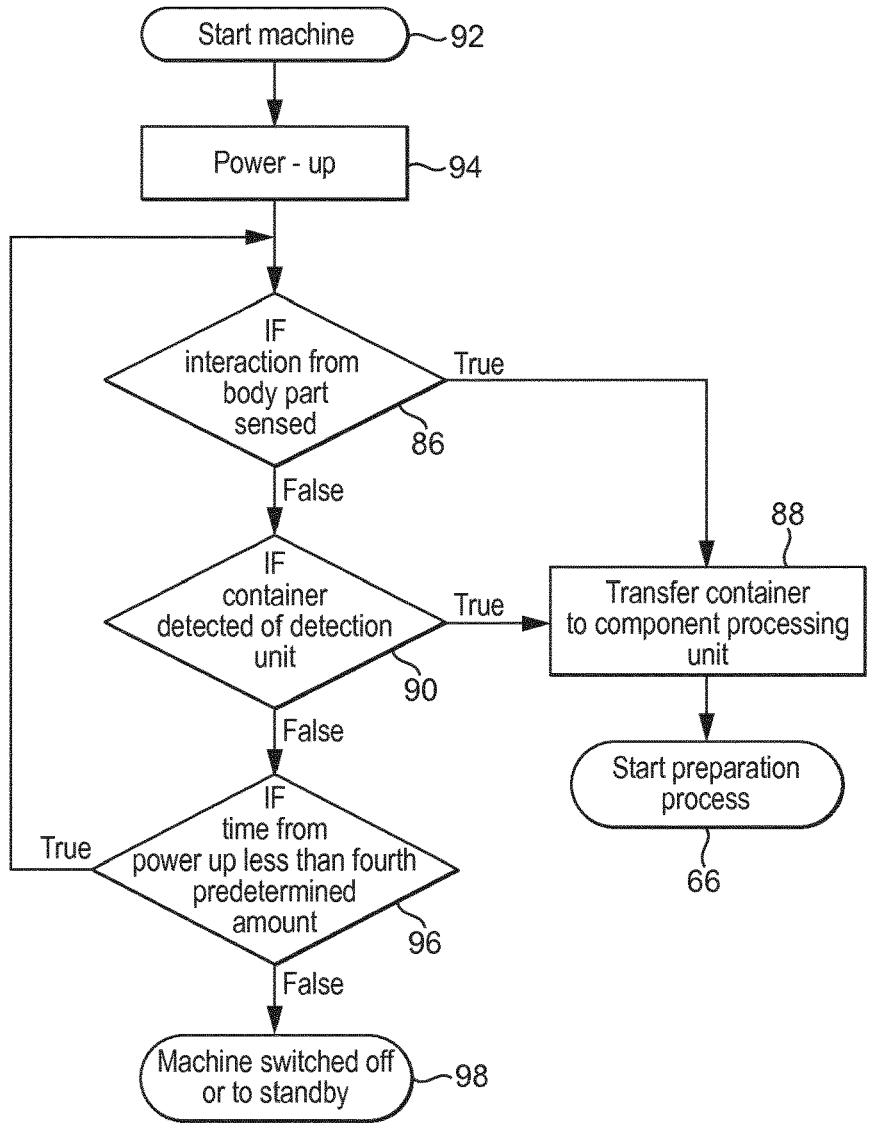
Figure 8:
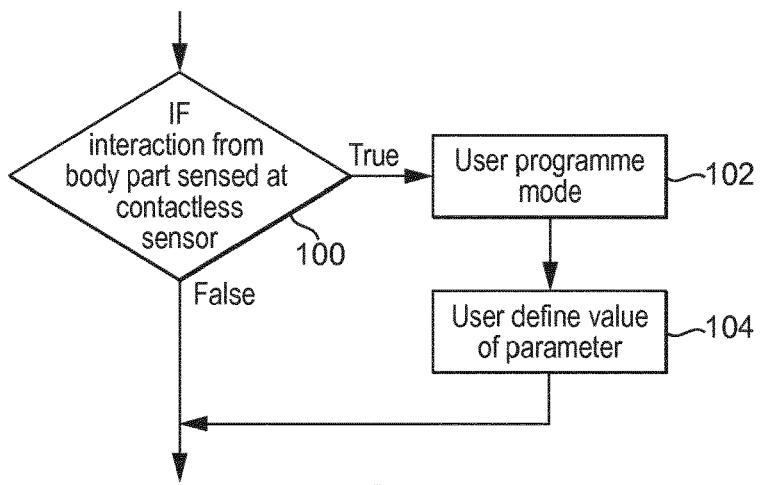

The control system 16 may be configured to implement further various logic conditions, which for descriptive purposes are shown in FIG. 7 and FIG. 8. These logic conditions are optionally combined with any of those discussed in the above (as shown in FIG. 6). Initially those logic conditions with reference to FIG. 7 will be described.

In an example of the beverage or foodstuff preparation machine 4 that comprises the container transmission unit 48, the control system 16 may be configured to control the transmission unit 48 to transfer a received container 6 to the component processing unit 14, e.g. by control of the actuator unit 52, which actuates the movable container support 50.

At optional condition 86, the control system 16 may in particular be configured to determine if an interaction of a body part is sensed by the contactless sensor 56. If true then block 88 is executed to control the container transmission unit 48 to effect transfer of a container to the component processing unit 14. In this way a user can control the machine 4 to execute a preparation process with any container they supply to the container transmission unit 48. The interaction of the body part associated with condition 86 may be a body part sensed at any distance or within the latter described first and/or second distance ranges. An advantage of requiring the interaction is made within the second distance range is that there is less accidental triggering.

In conjunction with a machine 4 that comprises a container transmission unit 48, the control system 16 may optionally comprise a container detection unit 54 operable to detect a container 6. In particular, the container detection unit 54 is arranged to detect a container 6 on the movable container support 50, accordingly it may be arranged on said support 50 (as shown in FIG. 3) or in operative proximity thereto. Typically the said unit 54 is operable to detect a metallic container 6, hence it may comprise an inductive sensor. In other examples it may comprise an optical or other suitable sensor.

At optional condition 90, the control system 16 may be configured to determine if a container 6 is detected by the container detection unit 54, and if true then to execute block 88 to transfer a container to the component processing unit 14.

Following transfer of the container 6 to the component processing unit 14 (block 88) typically the control system 16 is configured to execute the preparation process 66.

In addition to and preceding the two immediately preceding conditions: optionally block 92 comprises the machine 4 being switched on, e.g. by receiving a user command from a component of the user interface 36, such as a switch (not shown); block 94 comprises the control system 16 receiving the aforesaid switch on command and subsequently powering up the relevant components of the machine 4 from a switched off or standby state (e.g. by heating the fluid heater 24 to a particular temperature). The control system 16 may be configured to indicate power up by the feedback unit 58, e.g. by one or more of the visual indicators 60 thereof flashing.

Following completion of power up conditions 86 and 90 are typically processed with a Boolean OR operator. The control system 16 generally maintains the machine 4 powered up for a fourth predetermined amount of time (such as 2-10 minutes) as indicated by condition 96. During the fourth predetermined amount of time the control system 16 searches for conditions 86 and 90 (as indicated by the loop from block 96), if neither conditions are true within the predetermined amount of time, then the control system 16 can switch the relevant components of the machine 4 off or to a standby mode as indicated by block 98.

FIG. 8 illustrates further logic conditions which may optionally be executed within the loop around condition 70 of FIG. 6 (i.e. before condition 70). In particular, as indicated by condition 100, the contactless sensor 56 may be operable to identify a distance of an interaction of a body part from said sensor. The control system 16 may be configured to determine if said body part is within a first distance range or a second (i.e. non overlapping) distance range, which is different to the first distance range.

The first distance range may be associated with the aforesaid body part interactions, i.e. those associated with the conditions in FIG. 6. The first distance range may be a distance distal said sensor, e.g. greater than directly at or 5 cm or 10 cm from the contactless sensor (and up to the nominal range of the sensor). The second distance range may be a distance proximal said sensor, e.g. directly at (e.g. a user placed their hand directly over the contactless sensor) or less than 5 cm or 10 cm from the contactless sensor.

In response to the determination of an interaction of a body part within the second distance range the control system 16 may be configured to operate in a user programmable mode (as indicated by block 102). Advantageously the functionality of the user interface is increased. The user programmable mode typically comprises user defining one of the aforesaid stored values for the parameter as indicated by block 104. Typically the value is assigned in association with one of the visual indicators 60 of the feedback unit 58. Typically a value for the parameter is determined based on a duration of the interaction of the body part and/or at a stage in a preparation process when said interaction of the body part is made/removed.

As an example of the latter, whereby the parameter is volume: the user may maintain the aforesaid interaction of the body part whilst one of the visual indicators 60 is indicated and the receptacle is being filled; and when the user removes the interaction the volume value that has been filled is stored on the memory unit 46 in association with the particular visual indicator 60.

As an example of the former, whereby the parameter is temperature: a value of a parameter associated with an indicated visual indicator 60 may be user defined based on a duration of the interaction, e.g. a longer interaction equates to a higher temperature or the converse.

LIST OF REFERENCES

2 Beverage or Foodstuff Preparation System
4 Beverage or Foodstuff Preparation Machine
10 Housing
110 Base
112 Body
14 Component Processing Unit
12 Fluid supply
20 Reservoir
22 Fluid pump
24 fluid thermal exchanger
26 Extraction Unit
28 Injection head
30 Capsule holder
32 Capsule holder loading system
34A Capsule insertion channel
34B Capsule ejection channel
16 Control system
36 User interface
56 Contactless sensor
58 Feedback unit
60 Visual indicator
40 Sensors
42 Power supply
54 Container detection unit
48 Container transmission unit
50 Movable container support
52 Actuator unit
6 Container (capsule/receptacle/packet)

The invention claimed is:

1. A beverage or foodstuff preparation machine comprising:
a component processing unit configured to process a beverage or foodstuff component to prepare a beverage or foodstuff therefrom;
a container transmission unit arranged to receive a container from a user and operable to effect transfer of the container to the component processing unit; and
a control system configured to execute a preparation process comprising controlling the component processing unit to prepare the beverage or foodstuff, the control system comprising a user interface, wherein the user interface comprises:
a contactless sensor configured to sense, without physical contact, a body part of the user; and a feedback unit configured to provide feedback to the user; and
wherein the control system is configured to: sense as an input, using the contactless sensor, the body part of the user; and in response to change a value of a parameter associated with the preparation process and to indicate via the feedback unit a change in the value;
wherein the parameter is stored on a memory unit of the control system and comprises a variable configured to be changed in value to achieve a different characteristic of the prepared beverage or foodstuff, and wherein the variable is one or a combination selected from the group consisting of: beverage or foodstuff volume; beverage or foodstuff temperature; beverage or foodstuff strength; pressure during the preparation process; flow rate during the preparation process; and brewing time;
wherein the control system further comprises a detection unit configured to detect the container received by the container transmission unit,
wherein the control system is configured, upon detection of the container received by container transmission unit, to control the container transmission unit to effect the transfer and to execute the preparation process, and
wherein the control system is configured to increment, for each body part of the user sensed by the contactless sensor, the parameter to the next of a plurality of stored values by cycling through in a loop by a plurality of sensed inputs, whereby each change in value is indicated by the feedback unit,
wherein the control system is configured for at least three functions, the at least three functions comprising:
(i) enabling incrementing of the parameter if the input is sensed by the contactless sensor within a first predetermined amount of time from execution of the preparation process;
(ii) stopping the preparation process if the input is sensed by the contactless sensor after the first predetermined amount of time; and
iii) restarting the preparation process if the input is sensed by the contactless sensor within a second predetermined amount of time commencing from the stopping of the preparation process.

2. The beverage or foodstuff preparation machine according to claim 1, wherein the contactless sensor comprises a proximity sensor.

3. The beverage or foodstuff preparation machine according to claim 2, wherein the proximity sensor is configured for proximity detection by one or a combination selected from the group consisting of: electromagnetic field; electromagnetic radiation (infrared); capacitance; induction; and photoelectric.

4. The beverage or foodstuff preparation machine according to claim 1, wherein the feedback unit comprises a visual indicator.

5. The beverage or foodstuff preparation machine according to claim 1, wherein the feedback unit comprises a plurality of visual indicators, whereby each visual indicator indicates a separate value or any change in value of the parameter.

6. The beverage or foodstuff preparation machine according to claim 1, wherein the control system is configured to sense subsequent inputs from the body part by the removal and introduction of the body part in an operative range of the contactless sensor or a duration the body part is maintained in the operative range of the contactless sensor.

7. The beverage or foodstuff preparation machine according to claim 1, wherein the control system is configured to control the container transmission unit to effect transfer of the container to the component processing unit if the input is sensed by the contactless sensor.

8. The beverage or foodstuff preparation machine according to claim 1, wherein the contactless sensor comprise a proximity sensor operable to identify a distance of the body part of the user from the sensor and the control system is configured to determine if the body part is within a first distance range or a second distance range, which is different to the first distance range,
the control system is configured to operate in a user programmable mode if the body part is determined within the second and distance range, and
the user programmable mode comprising user defining a value for the parameter.

9. The beverage or foodstuff preparation machine according to claim 1, wherein the container transmission unit comprises a movable container support and further comprises an actuation unit configured to actuate the movable container support between a container receiving position and a container transmission position, the movable container support in the container transmission position is arranged above the component processing unit such that the container is transmitted by gravity from the movable container support to the component processing unit.

* * * * *